(12) United States Patent
Ohk

(10) Patent No.: US 8,705,086 B2
(45) Date of Patent: Apr. 22, 2014

(54) ARRANGEMENT FOR EXTRACTING DOCUMENT FROM SCAN MADE WITH COVER OPEN

(75) Inventor: Hyung-soo Ohk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 12/566,001

(22) Filed: Sep. 24, 2009

(65) Prior Publication Data

US 2010/0073721 A1 Mar. 25, 2010

(30) Foreign Application Priority Data

Sep. 25, 2008 (KR) ........................ 10-2008-0094286

(51) Int. Cl.
*G06F 3/12* (2006.01)
(52) U.S. Cl.
USPC .......... 358/1.15; 358/1.13; 358/1.9; 358/452; 358/464; 358/474; 358/505; 358/538; 382/190
(58) Field of Classification Search
USPC .............. 345/629; 348/207.1, 239; 358/1.13, 358/1.15, 1.9, 452, 462, 464, 474, 505, 519, 358/538; 382/130, 190, 209; 399/376; 702/35
See application file for complete search history.

(56) References Cited

U.S. PATENT DOCUMENTS

| | | | |
|---|---|---|---|
| 5,805,970 A * | 9/1998 | Kasamatsu | 399/376 |
| 5,880,858 A * | 3/1999 | Jin | 358/487 |
| 6,683,984 B1 * | 1/2004 | Simske et al. | 382/190 |
| 7,031,550 B2 * | 4/2006 | Nakajima | 382/274 |
| 2003/0090751 A1 * | 5/2003 | Itokawa et al. | 358/538 |
| 2004/0012676 A1 * | 1/2004 | Weiner et al. | 348/207.1 |
| 2005/0185227 A1 * | 8/2005 | Thompson | 358/474 |
| 2006/0018674 A1 * | 1/2006 | Hirata et al. | 399/29 |
| 2008/0002861 A1 * | 1/2008 | Yano et al. | 382/115 |
| 2008/0123163 A1 * | 5/2008 | Nakano et al. | 358/498 |

FOREIGN PATENT DOCUMENTS

| | | | | |
|---|---|---|---|---|
| EP | 765070 A2 * | 3/1997 | | H04N 1/00 |
| EP | 1748642 A1 * | 1/2007 | | H04N 1/00 |
| JP | 07-023224 | 1/1995 | | |
| JP | 2008124604 A * | 5/2008 | | |

OTHER PUBLICATIONS

Massimo Piccardi, "Background Subtraction techniques: a review", IEEE International Conference on Systems, Man and Cybernetics 2004, IEEE publication 0-7803-8566-7.*
Korean Office Action dated Nov. 1, 2012 issued in KR Application No. 2008-0094286.

* cited by examiner

*Primary Examiner* — David S Cammack

(74) *Attorney, Agent, or Firm* — Stanzione & Kim, LLP

(57) ABSTRACT

A scanner, an image forming apparatus including the same, an image processing method of the scanner and a printing method of the image forming apparatus. The image processing method includes acquiring an environment image, acquiring a main scan image by scanning a document on a flatbed, and extracting a document image from the main scan image using the environment image when the document is scanned with the cover in an open position.

24 Claims, 11 Drawing Sheets

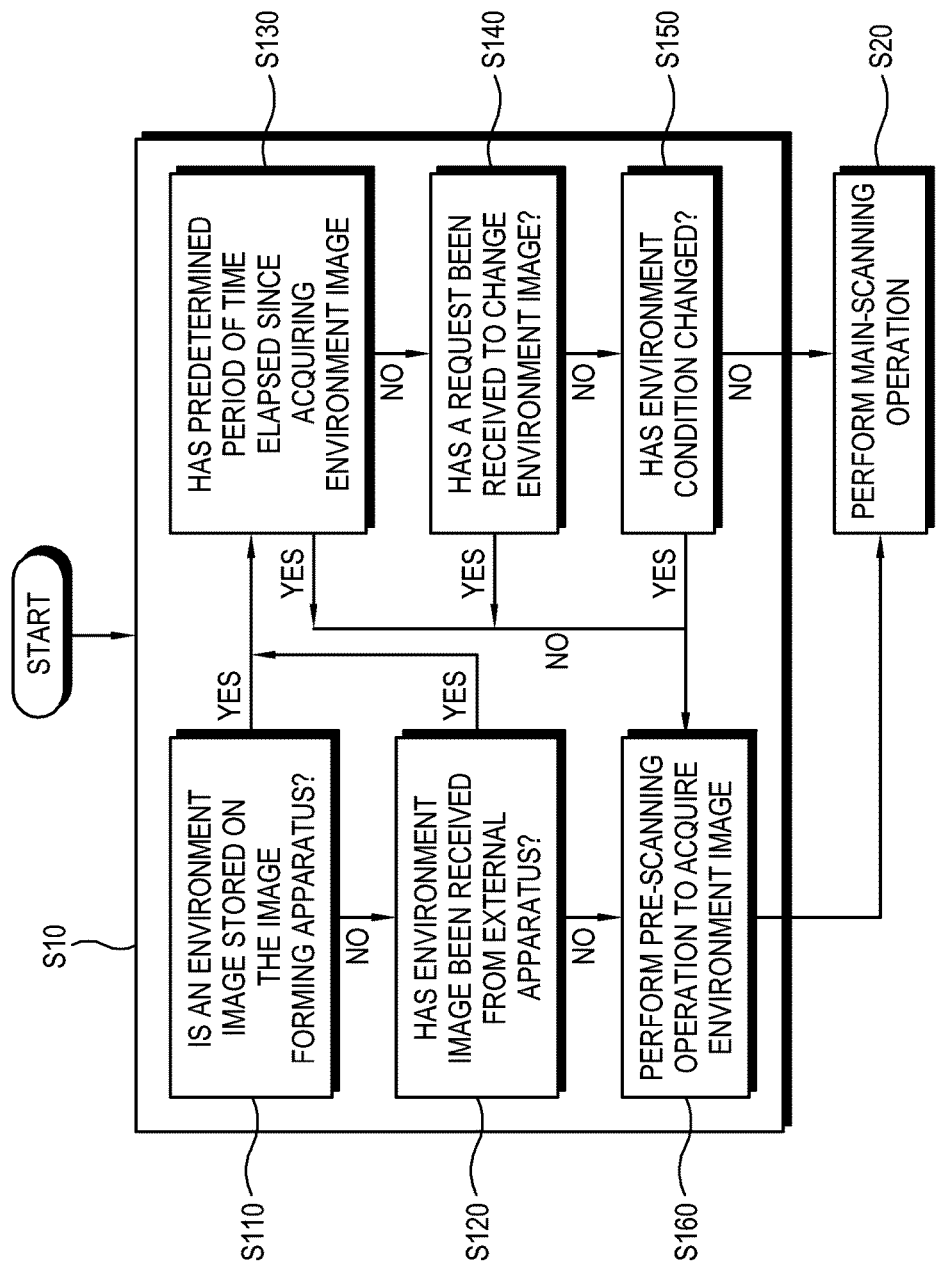

ARRANGEMENT FOR EXTRACTING DOCUMENT FROM SCAN MADE WITH COVER OPEN

CROSS-REFERENCE TO RELATED APPLICATIONS

This application claims the benefit of priority under 35 U.S.C. §119(a) from Korean Patent Application No. 10-2008-0094286, filed on Sep. 25, 2008 in the Korean Intellectual Property Office, the disclosure of which is incorporated herein by reference in its entirety.

BACKGROUND

1. Field of the Invention

Apparatuses and methods consistent with the present general inventive concept relate to a scanner, an image forming apparatus including the same, an image processing method in the scanner and a printing method in the image forming apparatus which can acquire a high quality document image in the state that a scanner cover is open.

2. Description of the Related Art

A scanner generally includes a scanning unit provided under a flatbed to read information of an image of a document laid on the flatbed. The scanning unit emits light towards the document through a light emitting module when a cover is closed to cover the flatbed, and focuses the reflected light onto an image sensor through a focusing lens, thereby acquiring image data of the document.

Such a scanner may be provided as an independent product, or as a part of a copier or a multi-function device.

However, in the conventional scanner, when the cover is open so that the flatbed is exposed to an external environment, external light in addition to the light reflected from the document is introduced into the image sensor, thereby preventing detection of a document region corresponding to the size of the document.

Further, in the conventional copier, when the cover is open so that the flatbed is exposed to an external environment, a region other than a document region may be output as a solid black image, thereby causing unnecessary consumption of a developer. Further, an unexpected image may be formed on an output medium due to external light. When an external light source such as a fluorescent lamp exists in a place where the copier is installed, an image of the external light source may be formed on the output medium.

SUMMARY

The present general inventive concept provides a scanner, an image forming apparatus including the same, an image processing method of the scanner and a printing method of the image forming apparatus in which unnecessary consumption of a developer can be reduced.

The present general inventive concept also provides a scanner, an image forming apparatus including the same, an image processing method of the scanner and a printing method of the image forming apparatus which can improve user convenience.

Additional features and utilities of the present general inventive concept will be set forth in part in the description which follows and, in part, will be obvious from the description, or may be learned by practice of the general inventive concept.

Embodiments of the present general inventive concept can be achieved by providing an image processing method of a scanner including a flatbed for scanning a document and a cover to open and close with respect to the flatbed, the method including acquiring an environment image, acquiring a main scan image by scanning a document on the flatbed, and extracting a document image from the main scan image using the environment image when the document is scanned with the cover in an open position.

The acquiring of the environment image may include reading a pre-stored environment image.

The acquiring of the environment image may further include acquiring a new environment image according to a received request or a change in an environment condition.

The environment condition may include at least one of an IP address of the scanner and a power supply status of the scanner.

The acquiring of the environment image may include at least one of performing a pre-scanning operation for an external environment of the scanner with the cover in the open position and receiving an environment image from an external apparatus connected to the scanner.

The extracting of the document image may include detecting a document region corresponding to the size of the document using a medium image corresponding to a difference between pixel values of the main scan image and the environment image, and extracting the document image corresponding to the detected document region from the main scan image.

The extracting of the document image corresponding to the detected document image may include cropping the main scan image using the detected document region.

The detecting the document region may include replacing each pixel value of the medium image one of a first pixel value and a second pixel value with reference to a predetermined threshold, and detecting the document region from the replaced medium image on the basis of at least one of the number of pixels having the first pixel value and the number of pixels having the second pixel value.

The method may further include transmitting the extracted document image to an external apparatus connected to the scanner.

Embodiments of the present general inventive concept can also be achieved by providing a printing method of an image forming apparatus including a scanning part which scans a document on a flatbed and a cover to open and close with respect to the flatbed, the method including acquiring an environment image, scanning a document on the flatbed and forming a main scan image, extracting a document image from the main scan image using the environment image when the scanning is performed with the cover being in an open position; and printing the extracted document image.

Embodiments of the present general inventive concept can also be achieved by providing a printing method of an image forming apparatus including a scanning part which scans a document on a flatbed and a cover to open and close with respect to the flatbed, the method including determining whether an environment image is stored when a copy command is input when the cover is in an open position, acquiring a main scan image by scanning a document on the flatbed when it is determined that the environment image is stored, and extracting a document image from a main scan image using the environment image, and outputting an error message when it is determined that the environment image is not stored.

Embodiments of the present general inventive concept can also be achieved by providing a scanner including a flatbed, a cover to open and close with respect to the flatbed, a scanning part to obtain a main scan image by scanning a document on the flatbed, a storage part to store an environment image, and a controller to extract a document image from the main scan image using the environment image when the document is scanned with the cover in an open position.

The controller may control the scanning part to perform a pre-scanning operation for an external environment of the scanner according to at least one of a received request and a change in an environment condition, and may store a pre-scan image acquired by the pre-scanning operation as the environment image in the storage part.

The environment condition may include at least one of an IP address of the scanner and a power supply status of the scanner.

The scanner may further include a communication part to communicate with an external apparatus, and the controller may receive an environment image from the external apparatus through the communication part according to at least one of a received request and a change in an environment condition to update the environment image.

The controller may detect a document region corresponding to the size of the document using a medium image corresponding to a difference between pixel values of the main scan image and the environment image.

The controller may replace each pixel value of the medium image with a first pixel or a second pixel value with reference to a predetermined threshold, and may detect the document region in the replaced medium image on the basis of at least one of the number of pixels having the first pixel value and the number of pixels having the second pixel value.

The scanner may further include a communication part to communicate with an external apparatus, and the controller may transmit the extracted document image to the external apparatus through the communication part.

Embodiments of the present general inventive concept can also be achieved by providing an image forming apparatus including: a flatbed, a cover to open and close with respect to the flatbed, a scanning part to acquire a main image by scanning a document on the flatbed, a storage part to store an environment image, a controller to extract a document image from the main scan image using the environment image when the document is scanned with the cover in an open position, and a printing part which prints the document image extracted by the scanner on a printing medium.

Embodiments of the present general inventive concept can also be achieved by providing an image forming apparatus including a scanning part to scan a document to obtain a main scan image, a storage part to store an environment image, and a controller to extract a document image from the main scan image using the environment image when the document is scanned with the scanning part being exposed to an external environment of the image forming apparatus.

Embodiments of the present general inventive concept can also be achieved by providing an image processing method of an image forming apparatus including a scanning part, the method including acquiring an environment image, acquiring a main scan image by scanning a document, and extracting a document image from a main scan image using the environment image when the document is scanned with the scanning part being exposed to an external environment of the image forming apparatus.

Embodiments of the present general inventive concept can also be achieved by providing an scanning method of an image forming apparatus including a cover to open and close with respect to a flatbed, the scanning method including acquiring an environment image, scanning a document to acquire a main scan image, and extracting a document image from the main scan image using the environment image when the document is scanned with the cover in an open position.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which

FIG. 11 is a flowchart illustrating an environment image acquirement process of FIG. 8.

DETAILED DESCRIPTION OF THE EMBODIMENTS

Figure 1:
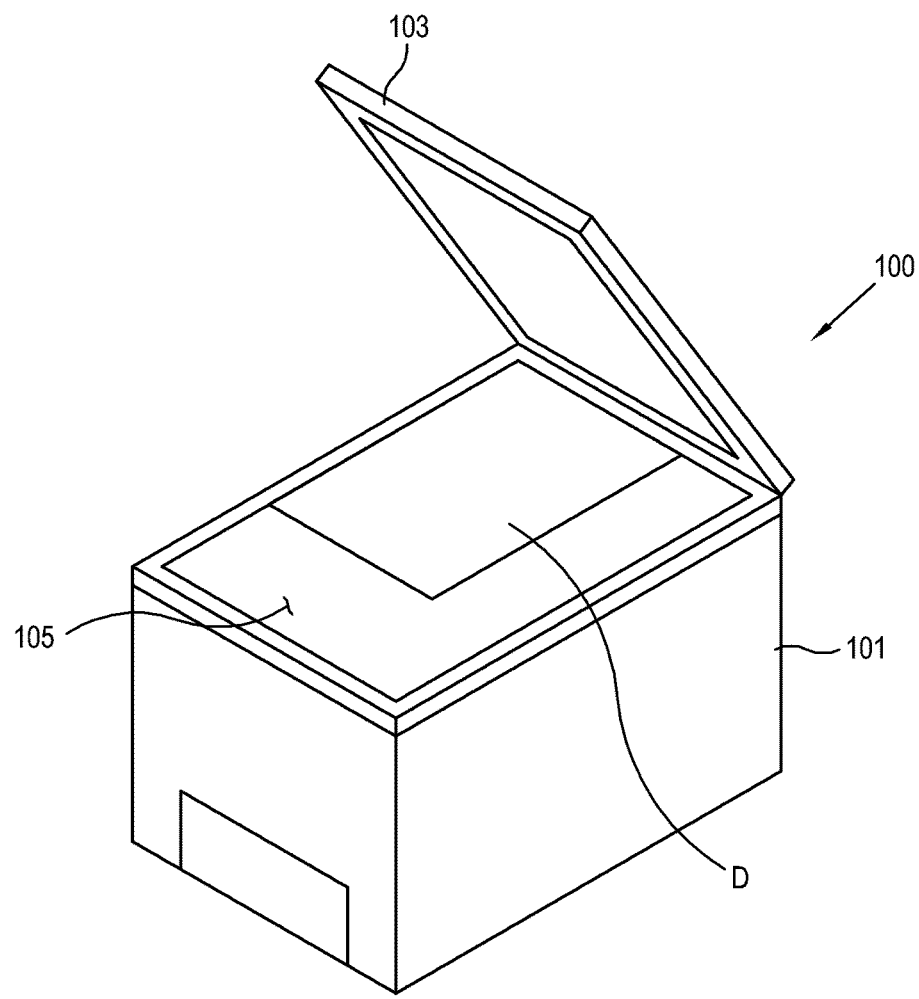
FIG. 1 is a perspective view illustrating an image forming apparatus according to an exemplary embodiment of the present general inventive concept.

Reference will now be made in detail to the exemplary embodiments of the present general inventive concept, examples of which are illustrated in the accompanying drawings, wherein like reference numerals refer to like elements throughout. The exemplary embodiments are described below so as to explain the present general inventive concept by referring to the figures.

Figure 2:
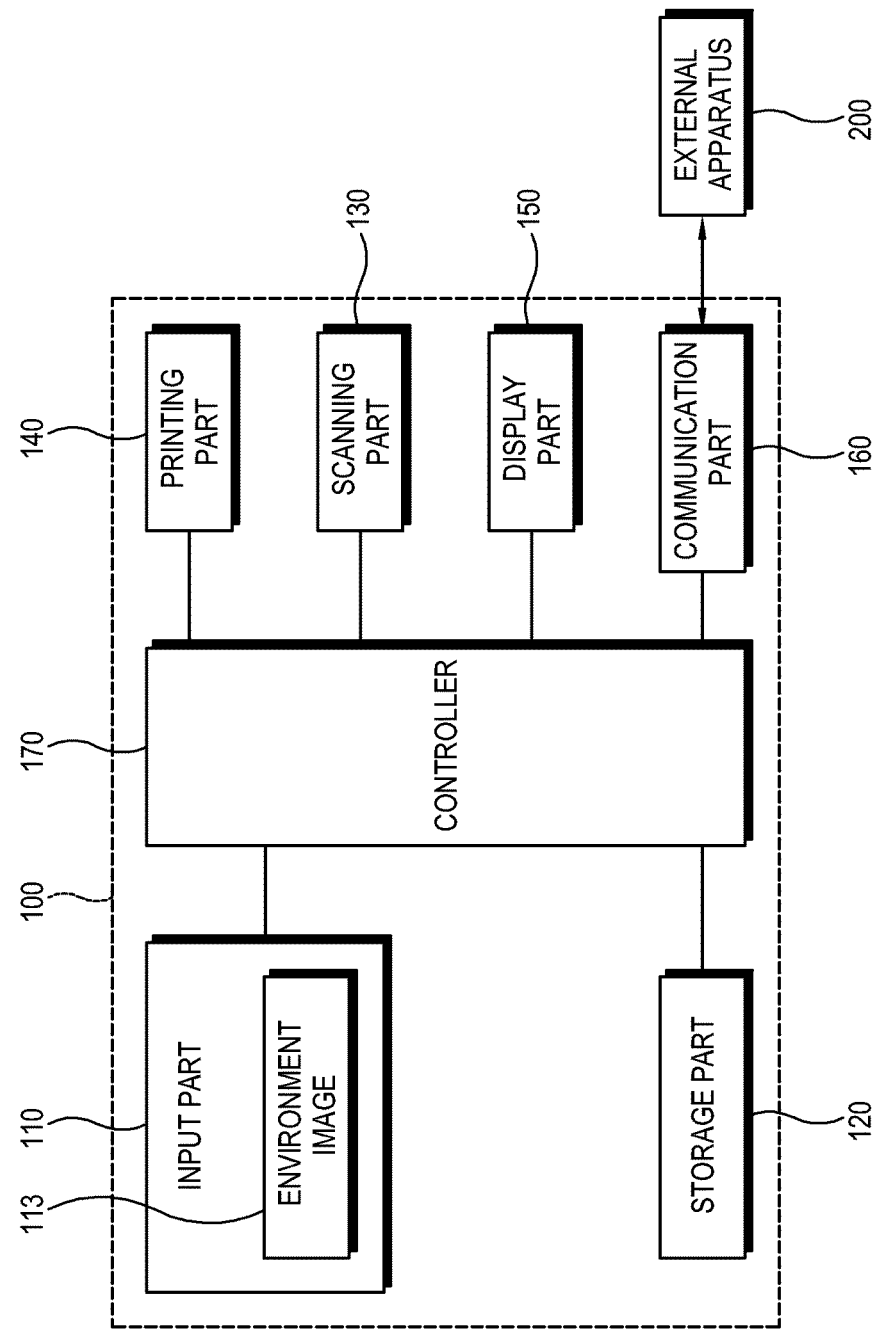
FIG. 2 is a block diagram illustrating an image forming apparatus according to an exemplary embodiment of the present general inventive concept.

As illustrated in FIGS. 1 and 2, an image forming apparatus 100 according to an exemplary embodiment of the present general inventive concept includes a body 101, a flatbed 105 of a transparent glass arranged on a top side of the body 101, a cover 103 which is hingedly installed to the body 101 to open and close the flatbed 105, a scanning part 130 for scanning a document D laid on the flatbed 105, a storage part 120 for storing an environment image, a printing part 140 for printing an image scanned by the scanning part 130 on a printing medium, and a controller 170.

The cover 103 may be disposed in a closed position or an open position. The cover 103 is in the closed position when the cover 103 is positioned in such a way as to prevent the flatbed 105 from being exposed to light external to the image forming apparatus 100. The cover 103 may be in the open position when the cover 103 is positioned in such a way that the flatbed 105 is exposed to any external light. For example, the cover 103 is open, or in an open position, when a small portion of the flatbed 105 is exposed to external light, when the entire flatbed 105 is exposed to external light, etc.

A scanner according to the present general inventive concept includes the same configuration as the image forming apparatus 100, except for the printing part 140. Accordingly, the following description, except for the printing part 140, will be commonly applied to the scanner and the image forming apparatus 100 according to the present general inventive concept.

The scanning part 130 includes a light source module (not illustrated) for emitting light towards the document D on the flatbed, and an image sensor (not illustrated) for converting the light reflected from the document D into an electrical signal.

The image sensor may include at least one of a CCD (Charge Coupled Device) sensor, a CMOS (Complementary Metal Oxide Semiconductor) sensor, and a CIS (Contact Image Sensor).

The storage part 120 may include at least one of an EEPROM (Electronically Erasable Programmable Read Only Memory), a hard disk, a flash memory, and the like. The storage part 120 may employ various known memories for storing the environment image.

The printing part 140 may be at least one of an electrophotographic type in which an image is formed on a printing medium through a series of processes of charging, exposure, developing, transfer, fixing and cleaning, an inkjet type in which ink is discharged through a nozzle to form at least one ink dot on a printing medium to form an image and a dye sublimation type in which an image is formed on a thermal paper using a thermal printing head (TPH).

If a main-scanning operation is performed with respect to a document when the cover 103 is open, the controller 170 extracts a document image from a main scan image acquired by the main-scanning operation on the basis of an environment image stored in the storage part 120. The main-scanning operation may acquire the main scan image by converting light reflected from the document D into an electrical signal. The main-scanning operation will be described later in further detail with reference to FIGS. 8 and 10.

In other words, even though the main-scanning operation may be performed when the cover 103 is open, the controller 170 may extract an image of the document D on the flatbed 105 from the main scan image using the environment image. If the main-scanning operation is performed when the cover is closed, the main scan image is acquired and transmitted to an external apparatus, without using the environment image. The extraction of an image of a document D will be described later in further detail with reference to FIGS. 8-10.

In the present exemplary embodiment, whether the main-scanning operation is performed when the cover 103 is open may be confirmed by a sensing signal from a sensor (not illustrated) for sensing whether the cover 103 is open or closed at the time of the main-scanning operation.

Further, when a cover-open copy command or a cover-open scan command is inputted by a user, it is possible to determine that the main-scanning operation is performed when the cover 103 is open, without the sensor (not illustrated). For this purpose, a 'cover-open copy' input key (not illustrated) for performing a copy operation when the cover 103 is open or a 'cover-open scan' input key (not illustrated) for performing a scan operation when the cover 103 is open may be provided in an input part 110 (to be described later). In the present exemplary embodiment, when a user pushes the input key, the main-scanning operation is performed with the cover 103 in an open position.

Figure 3:
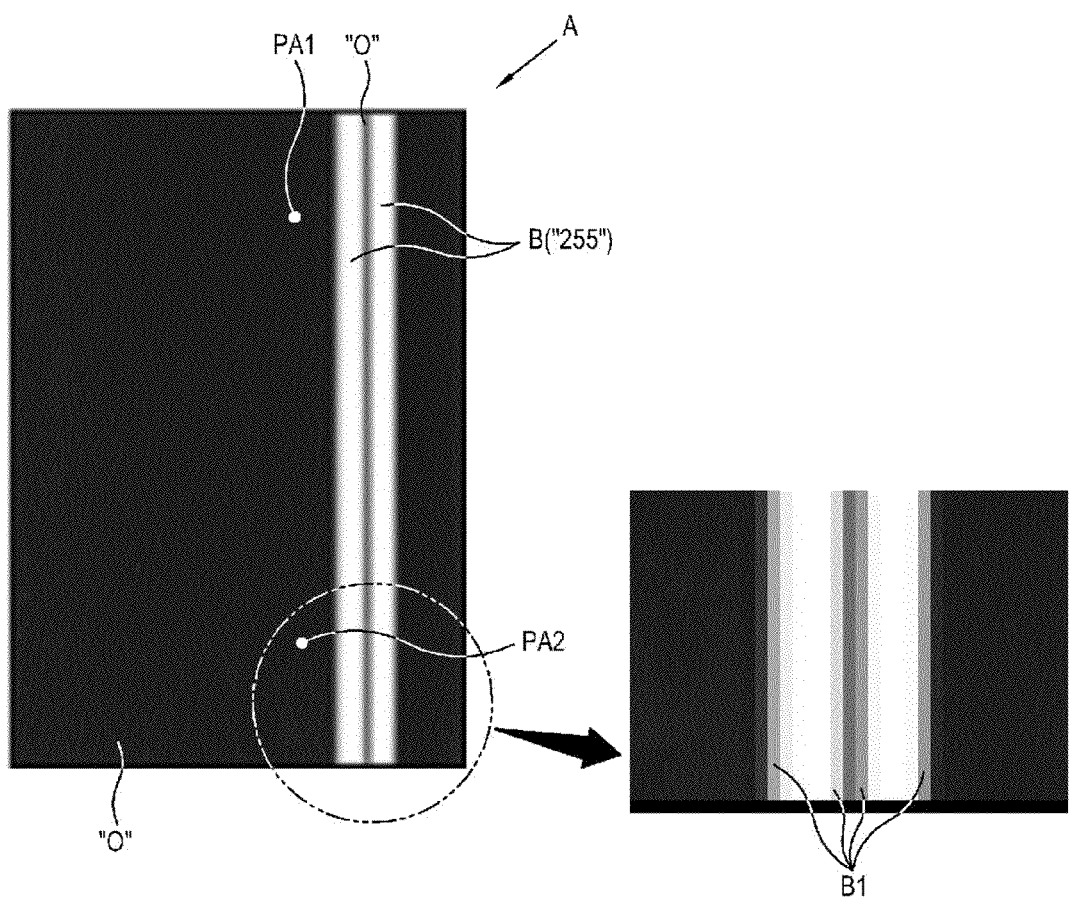
FIG. 3 illustrates an example of an environment image in an image forming apparatus according to an exemplary embodiment of the present general inventive concept.

The environment image is an image that corresponds to an external environment of the image forming apparatus 100. The environment image may be acquired by performing pre-scanning operation when the cover 103 is open and the document D has not been placed on the flatbed 105. The environment image is influenced by exterior light where the image forming apparatus 100 is installed. For example, if a fluorescent lamp is arranged above where the image forming apparatus 100 is installed, an environment image A may include a fluorescent lamp image B, as illustrated in FIG. 3.

When the image forming apparatus 100 is initially installed or an installation place thereof is changed, it is necessary to acquire a new environment image. In this case, the pre-scanning operation may be performed when the cover 103 is open and the document D has not been placed on the flatbed 105. After performing the pre-scanning operation, pre-scanned image data corresponding to the external environment of the image forming apparatus 100 is stored in the storage part 120 as the new environment image. If an old environment image was previously stored in the storage part 120, the new environment image may overwrite the old environment image.

Alternatively, the image forming apparatus 100 may receive an environment image from an external apparatus 200 such as a management server or a client through a communication part 160 (to be described later). The environment image received from an external apparatus 200 may be stored in the storage part 120. In this case, the image forming apparatus 100 does not need to perform the pre-scanning operation.

The controller 170 may determine that to acquire the environment image, or a new environment image, in the case of a user request, a change in an environment condition, or after a predetermined period of time has elapsed since the environment image was acquired. In this respect, the environment condition may include at least one of an IP address allocated to the image forming apparatus 100 and a power supply status of the image forming apparatus 100. If the IP address allocated to the image forming apparatus 100 is changed, the controller may determine to acquire the environment image. Additionally, if the image forming apparatus 100 powers on, the controller 170 may determine that the change in the power supply status of the image forming apparatus 100 from an off-state to an on-state requires the acquisition of the environment image. Additionally, the predetermined period of time may be set by a user, a manufacturer, etc.

More specifically, when the IP address allocated to the image forming apparatus 100 is changed, the controller 170 may determine that the installation place of the image forming apparatus 100 has also changed, and may control the scanning part 130 to perform the pre-scanning operation or control the communication part 160 to receive the environment image from the external apparatus 200. Similarly, when the image forming apparatus 100 powers on, the controller 170 may determine that the installation place thereof is changed, and may control the scanning part 130 to perform the pre-scanning operation or control the communication part 160 to receive the environment image from the external apparatus 200.

As described above, for the pre-scanning operation, the cover 103 should be open. The controller 170 may visually notify a user to open the cover 103 through a display part 150 such as an LCD window. Further, the controller 170 may audibly notify the user through a speaker, or by other known methods.

A driving motor (not illustrated) for opening and closing the cover 103 may be provided. If the image forming apparatus 100 includes a driving motor, the controller 170 may control the driving motor to automatically open the cover 103, prior to performing the pre-scanning operation.

The image forming apparatus 100 may further include the input part 110 for receiving a copy command, a print command, and a display command to display information regarding the image forming apparatus 100. The input part 100 may further include an environment image button 113 for generation of the environment image in the case that the installation place of the image forming apparatus 100 has been changed or the image forming apparatus 100 is initially installed. That is, if a user pushes the environment image button 113, the controller 170 may control the scanning part 130 or the communication part 160 to acquire the environment image. If the cover 103 is closed when the user pushes the environment image button 113, the controller 170 may visually or audibly notify the user to open the cover 103.

Figure 4:
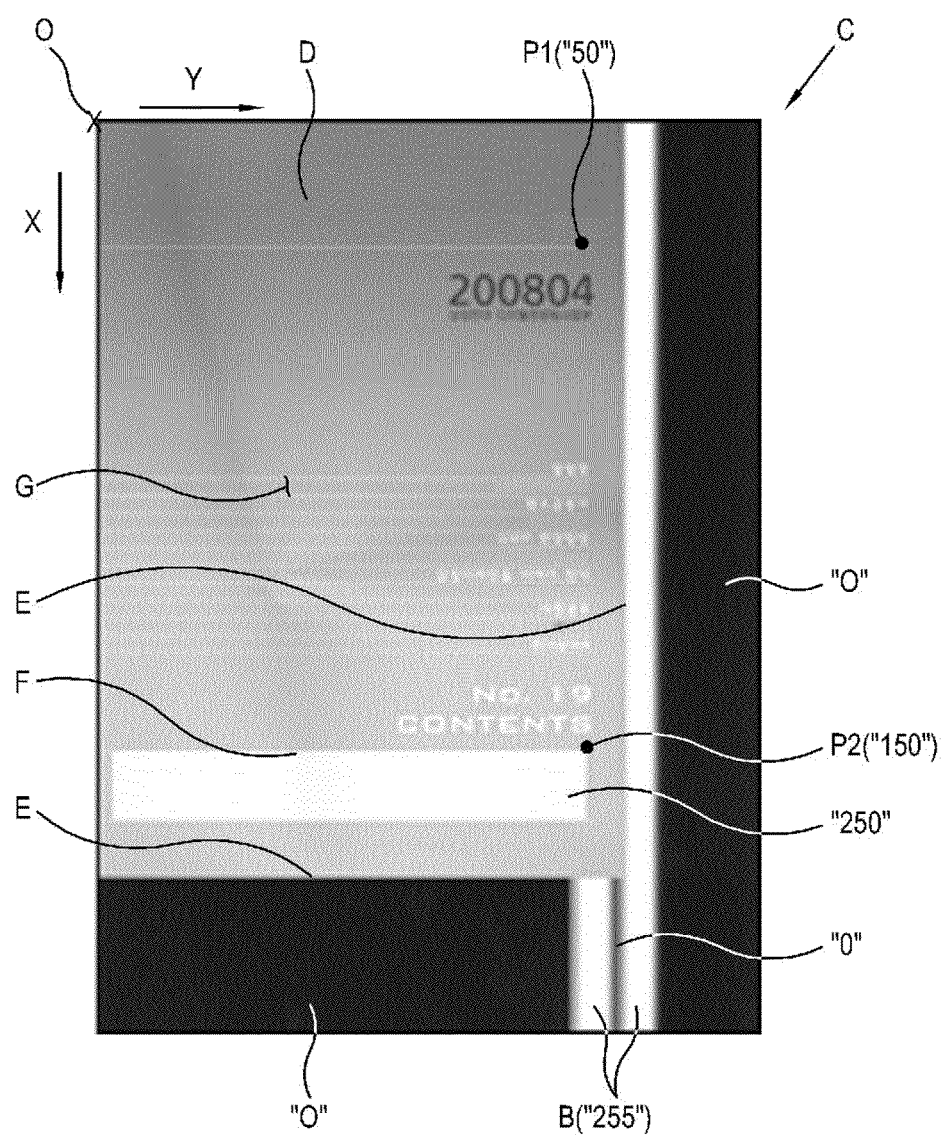
FIG. 4 illustrates an example of a main scan image in an image forming apparatus according to an exemplary embodiment of the present general inventive concept.

In the present exemplary embodiment, the environment image as illustrated in FIG. 3 is used, so that when the main-scanning operation for the document D on the flatbed 105 is performed to copy or scan the document D, a main scan image C is acquired as illustrated in FIG. 4.

The controller 170 compares the environment image A with the main scan image C to detect a document region G in which an image of the document D is formed. That is, the controller 170 may detect a boundary E of the document region G, to thereby detect the document region G. The document region G refers to the portion of the main scan image C that corresponds to the document D. The boundary E refers to the outer edges of the document region G.

The controller 170 may determine a boundary, which does not exist in the environment image A, but is included in the main scan image C, is the boundary E of the document region G.

As illustrated in FIG. 3, four boundary lines B1 exist in the environment image A corresponding to two vertical fluorescent lamp images B. As illustrated in FIG. 4, when the document D is scanned, the new boundary E is generated. The boundary E may be detected by the controller 170 based on the different placement and color from the four boundary lines B1.

Figure 7:
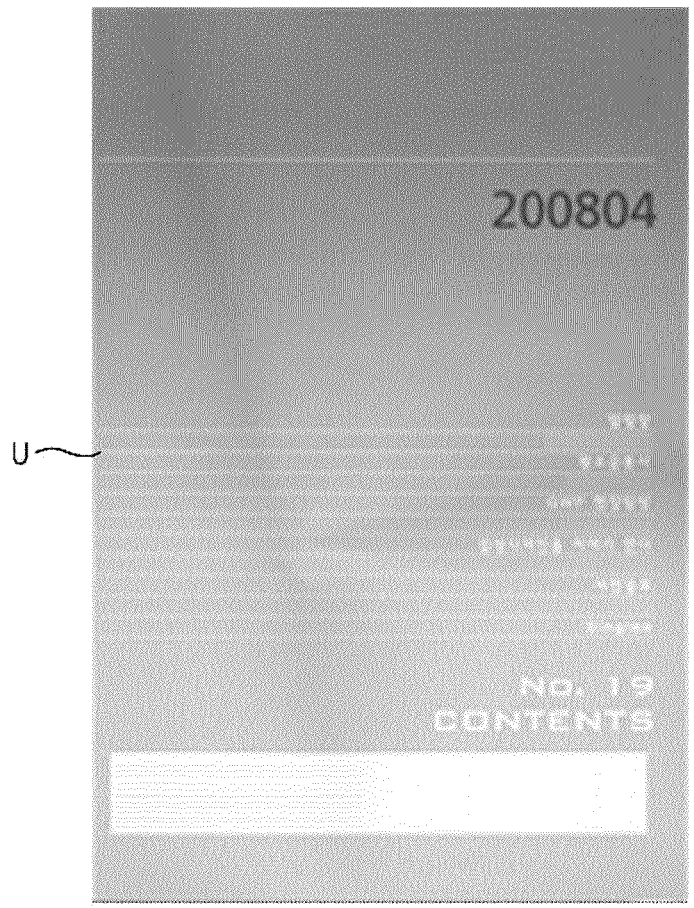
FIG. 7 illustrates an example of a document image extracted from the main-scan image in FIG. 4.

Accordingly, the controller 170 detects from the main scan image C the boundary E which does not exist in the environment image A, and determines that an inner region of the detected boundary E is the document region G, thereby extracting a document image corresponding to the document region G from the main scan image C. In other words, a controller 170 compares the main scan image C with the environment image A. The controller 170 detects the boundary E, and determines that an inner region of the detected boundary E is the document region G. The controller 170 extracts a document image U corresponding to the document G from the main scan image C in FIG. 4 as illustrated in FIG. 7.

The boundaries in the main scan image C and the environment image A may be detected using a contour extraction algorithm. The boundaries or contours may be detected using a change in brightness by a differential operator. The contour extraction algorithm may include Sobel, Prewitt, Robert, Laplacian, Canny and the like.

With the conventional contour extraction algorithm, a boundary F in the document region G having a change in brightness may be detected from the main scan image C. If a plurality of boundaries, such as E and F, are detected, the controller 170 may determine that the boundary E which is the farthest from a scanning origin O is the boundary of the document region G.

Alternatively, the controller 170 may detect the document region G using a medium image corresponding to a difference between pixel values (gray scale) of the environment image stored in the storage part 120 and the main scan image obtained by the main-scanning operation in the scanning part 130. The pixel values may be 8 bits and may be represented as numerals "0" to "255". As illustrated in FIGS. 3 and 4, the pixel value "0" refers to a strength of 100% (100% black in the case of a white and black scan mode); and the pixel value "255" refers to a strength of 0% (white in the case of the white and black scan mode).

Figure 5:
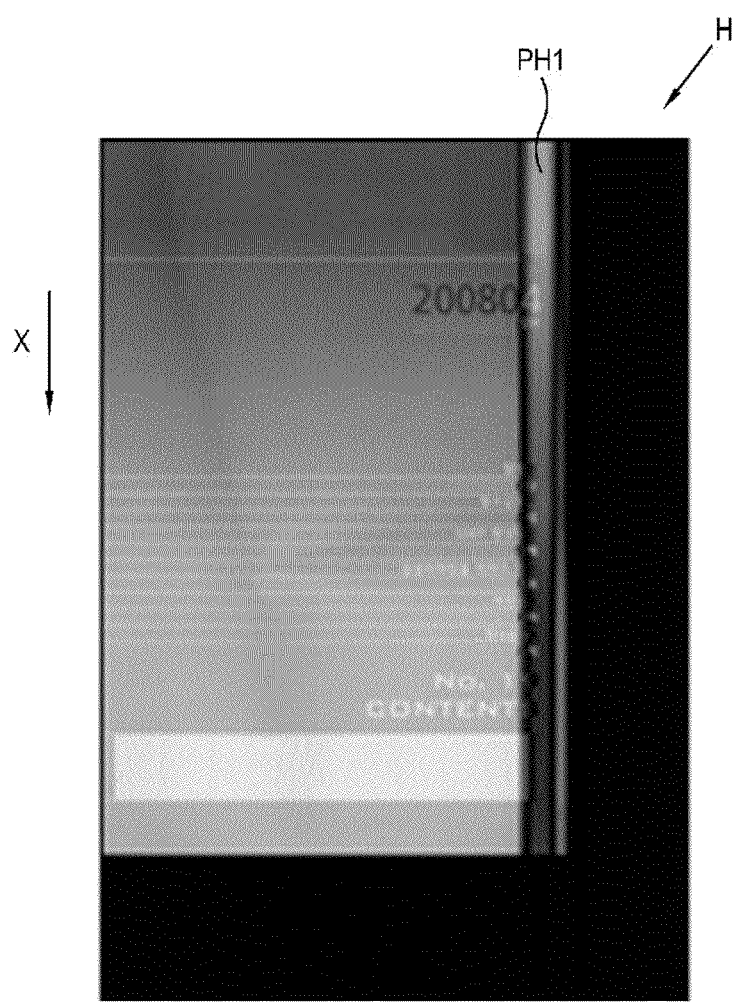
FIG. 5 illustrates an example of a medium image corresponding to a gray scale difference between the environment image in FIG. 3 and the main scan image in FIG. 4.

For example, the controller 170 may subtract pixel values of the environment image A in FIG. 3 from pixel values of the main scan image C in FIG. 4, to thereby generate a medium image H as illustrated in FIG. 5. The generation of the medium image H may be performed pixel by pixel, so that the value of each pixel of the environment image A is subtracted from the value of each pixel of the main scan image C.

More specifically, if a black pixel value "0" of the environment image A in FIG. 3, from a region other than the fluorescent lamp images B, is subtracted from a black pixel value "0" of regions outside of the document region G of the main scan image C in FIG. 4, the difference is "0". Accordingly, a pixel of the medium image H corresponding to the subtracted black pixels above is displayed in black. In contrast, if a white pixel value "255" of the fluorescent lamp images B of the environment image A in FIG. 3 is subtracted from a white pixel value "255" of the fluorescent lamp images B of the regions outside of the document region G of the main scan image C in FIG. 4, the difference is "0". Accordingly, a pixel of the medium image H corresponding to the subtracted white pixels above is also displayed in black.

Even though black pixel values "0" of the environment image A in FIG. 3, except the fluorescent lamp images B, are subtracted from pixel values (0 to 255) of the document image inside of the document region G in FIG. 4, pixels of the medium image H have the same pixel values as the document image. In other words, since the entire environment image A, except for the fluorescent lamp images B, is black or has black pixel values "0", subtracting the black pixel values from the pixel values (0 to 255) of the medium image H results in the pixel values of the medium image H. Accordingly, the pixels of the medium image H in FIG. 5 have the same pattern in the document region G in FIG. 4, except for the region of the fluorescent lamp image B.

Here, if the pixel value obtained by subtracting a pixel value of the environment image A in FIG. 3 from a pixel value of the main scan image C in FIG. 4 becomes a negative number (−), an absolute value thereof is used.

For example, if a pixel P1 has a pixel value "50" in the main scan image C in FIG. 4, and a pixel PA1 corresponding to the pixel P1 has a pixel value "255" in the environment image A in FIG. 3, as part of the fluorescent lamp images B, a difference therebetween is −205. Accordingly, an absolute value "205" is used for determining what color to display in the corresponding pixel PH1 of medium image H. Further, if a pixel P2 has a pixel value "150" in the main scan image C in FIG. 4, and a pixel PA2 corresponding to the pixel P2 has a pixel value "255" in the environment image A in FIG. 3, as part the fluorescent lamp images B, a difference therebetween is −105. Accordingly, an absolute value "105" is used for determining what gray scale to display in a corresponding pixel of medium image H. Accordingly, in the medium image H, a gray scale change in an X direction in a region where the document region G and the fluorescent lamp image B are overlapped is contrary to that in the main scan image C.

After generating the medium image H, the controller 170 may replace each pixel value of the generated medium image H with at least one of a first pixel value and a second pixel value with reference to a predetermined threshold.

In this respect, it is assumed that the first pixel value is "0" (a strength of 100%, black) and the second pixel value is "255" (a strength of 0%, white), or vice versa. These values are only exemplary, and thus, the first and second pixel values may have other values.

The predetermined threshold may be any value determined by a user, a manufacturer, etc. For example, if the predetermined threshold is "150", if a pixel value of the medium image H is greater than or equal to "150", such as "180" ("180"≥"150"), the pixel value of the medium image H may be replaced with the second pixel value "255". If a pixel value of the medium image H is less than "150", such as "100" ("100"≥"150"), the pixel value of the medium image H may be replaced with the first pixel value "0".

Figure 6:
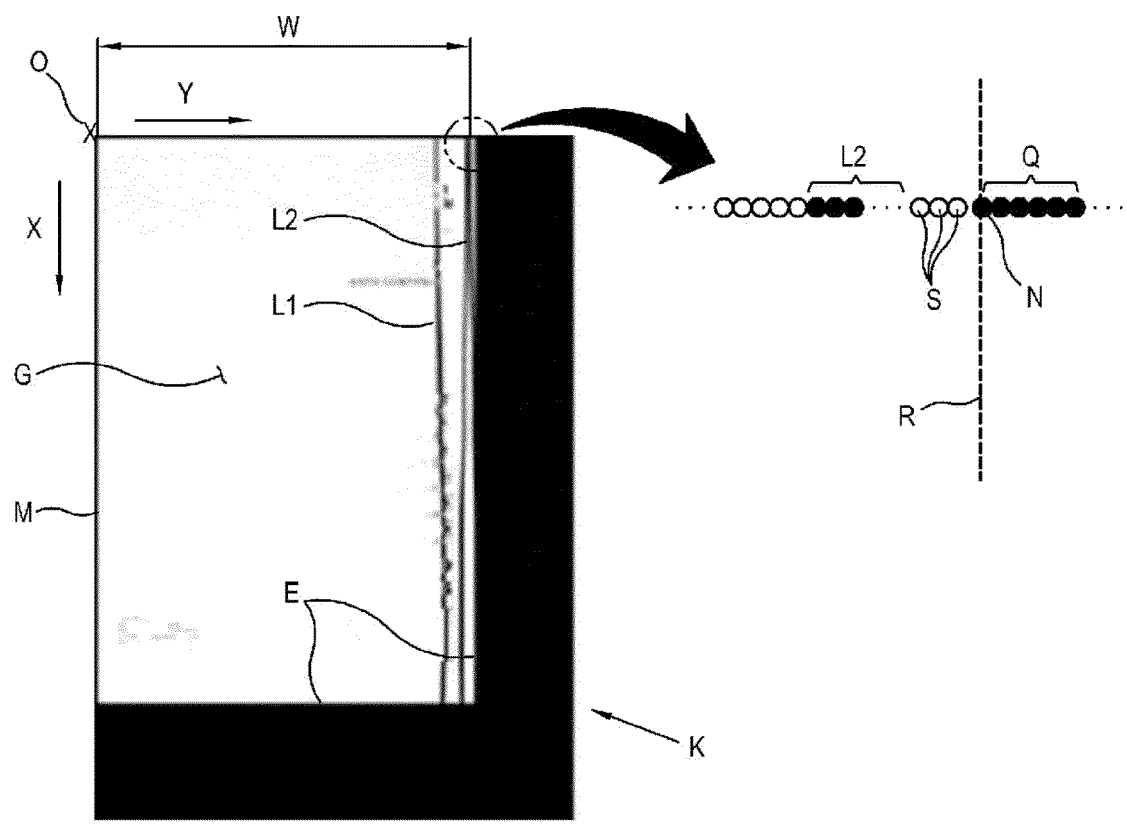
FIG. 6 illustrates an example of a replaced medium image obtained by replacing pixel values of the medium image in FIG. 5.

A medium image K may be generated by replacing each pixel value of the generated medium H with the first and second pixel values, as illustrated in FIG. 6. It is noted that the boundary E of the document region G is more clearly represented with naked eyes in the replaced medium image K, compared to the medium image H in FIG. 5. Alternatively, the replaced medium image K may be represented with a contrary gray scale, if it is assumed that "0" is white and "255" is black. In this case, a portion of the document region G may be represented in black; a portion other than the document region G may be represented in white.

The controller 170 may detect the document region (specifically, the document boundary) in a predetermined direction in the replaced medium image K on the basis of the number of consecutive pixels having at least one of the first pixel value and the second pixel value. For example, the controller 170 may detect the document region (specifically, the document boundary) in the predetermined direction in the replaced medium image K if the number of consecutive pixels having at least one of the first pixel value and the second pixel value is above a predetermined value.

A method for detecting the document region along a Y direction is as follows with reference to FIG. 6.

As illustrated in FIG. 6, the number of consecutive pixels having a first pixel value "0" (black) in the Y direction from the scanning origin O in the replaced medium image K is counted. Then, the number of consecutive pixels having a second pixel value "255" (white) in the Y direction is counted. The numbers of pixels are counted in this fashion until the number of consecutive pixels having the first pixel value exceeds a predetermined value.

According to an exemplary embodiment of the present general inventive concept as illustrated in FIG. 6, the number of first pixel values "0" are counted, then numerous second pixel values "255", then about ten first pixel values "0" in a region of a first black line L1, then numerous second pixel values "255", then about twenty first pixel values "0" in a region of a second black line L2, and then numerous second pixel values "255" are counted in sequence. Then, numerous first pixel values "0" are counted in a region outside of the boundary E of the document region G.

In the present exemplary embodiment, the predetermined value may be 100. Accordingly, in the case that a pixel group Q having 100 or more first pixel values "0" is detected in the replaced medium image K, the controller 170 may determine that a first pixel N in the Y direction of the group Q is a boundary point on the boundary E of the document region G.

In this respect, the boundary point may be any one of a second to a fifth pixel value "0" of pixel group Q in the Y direction. Alternatively, a pixel S having the second pixel value "255" adjacent to the pixel group Q may be the boundary point.

It is determined that the boundary E towards the Y direction of the document region G is a combination of pixels which exist in a line R extended from the boundary point N perpendicularly to the Y direction, that is, in an X direction. Since the document D has a rectangular shape, the boundary E of the document region G towards the Y direction can be detected through the extended line R passing through the single boundary point N, without detecting all boundary points towards the Y direction.

If the document D has an arbitrary shape other than the rectangular shape, the boundary of the document D towards the Y direction may be detected by combining all boundary points towards the Y direction starting from all pixels in a line M along the X direction. The boundary E of a document D with an arbitrary shape may be determined based on the boundary point N that is furthest along the Y direction. Additionally, the boundary E of a document D with an arbitrary shape may be determined for each row of pixels in the Y direction and each column of pixels in the X direction. Accordingly, the boundary E of a document D with an arbitrary shape may also have an arbitrary shape that corresponds to the shape of the document D.

A method for detecting the document region towards the X direction is similar to that towards the Y direction. Here, the X and Y directions may be orthogonal to each other.

For example, the first pixel value "0" towards the X direction from the scanning origin O may be detected. In the present exemplary embodiment, as illustrated in FIG. 6, a pixel of the replaced medium image K having the first pixel value "0" is detected around the lower boundary E of the document region G. If the number of consecutive pixels having the first pixel value "0" in a pixel group is more than a predetermined value (for example, 100), then the first pixel value "0" of the pixel group may be determined to be the lower boundary E of the document region G. In other words, a pixel nearest to the scanning origin O in the pixel group having the first pixel value, the number of which is more than the predetermined value, may be the boundary point toward the X direction. Alternatively, a pixel having the second pixel value "255" adjacent to the pixel group may be the boundary point towards the X direction.

Further, pixels present in a line perpendicular to the X direction, that is, in the Y direction from the boundary point, may form the lower boundary E of the document region G.

In the above-described exemplary embodiment, the boundary E of the document region is detected along the X and Y directions of the document, but the boundary detecting direction may be changed as required.

Further, in the above-described exemplary embodiment, the boundary E of the document region is detected by counting the number of consecutive pixels having the first pixel value in the predetermined directions. Alternatively, the boundary of the document region can be detected by counting the number of consecutive pixels having the second pixel value "255" (white). In other words, the pixel S farthest from the scanning origin O (or the line M) among the pixels having the second pixel value (white) may be the boundary point.

Alternatively, the number of pixels (including the number of the first pixel value in the first and second black lines L1 and L2) from the scanning origin O to the pixel S having the second pixel value may be counted to determine that the length corresponding to the number of the counted pixels is the document region. Further, since the document generally has a rectangular shape, it may be determined that the length corresponding to the number of the counted pixels is a width W of the document.

The method for counting the number of consecutive pixels having at least one of the first pixel value and the second pixel value to detect the document region may employ a variety of modifications. For example, with regard to a document D with an arbitrary shape, the method of counting the number of consecutive pixels may include counting the number of consecutive pixels having at least one of the first pixel value and the second pixel value for each row of pixels in the Y direction and each column of pixels in the X direction to detect the arbitrarily shaped document region of the document D.

If the boundary E in the X and Y directions is detected, the controller 170 may delete the pixels outside the boundary E in the X and Y directions from the main scan image C. Thus, a final or extracted document image U as illustrated in FIG. 7 may be extracted. In other words, the controller 170 may delete the pixels of the main scan image C that do not correspond to the document region G, as determined by detecting the boundary E of the medium image K.

The controller 170 may then control the printing part 140 to print the extracted document image U on a printing medium. Accordingly, according to the present general inventive concept, only the extracted document image U may be printed, thereby preventing unnecessary consumption of a developer (ink or toner), compared with the conventional method in which the main scan image C in FIG. 4 is printed as it is, including pixels outside the document region G or the boundary E.

Further, the image forming apparatus 100 may include the communication part 160 to communicate with the external apparatus 200.

The communication part 160 may include at least one of a serial port, a parallel port, a USB port and a network interface card for wired or wireless connection with an Internet network.

The controller 170 may transmit the extracted document image U to the external apparatus 200 through the communication part 160. The outside apparatus 200 may include at least one of a management server and a client. The client may include a personal terminal such as a computer, a PDA, a mobile phone, and the like.

Hereinafter, an image processing method of a scanner according to an exemplary embodiment of the present general inventive concept will be described referring to FIG. 8.

An environment image is acquired at operation S10. The environment image may be acquired by a pre-scanning operation with the cover 103 of the scanner being open or may be received from the external apparatus 200 connected to the scanner. In this respect, the environment image may be acquired according to a user request or a change in an environment condition. The environment condition may include at least one of an IP address allocated to the scanner and a power supply status of the scanner. That is, if the IP address of the scanner is changed or the scanner powers on, it is determined that the environment image should be acquired.

A main-scanning operation is performed to acquire a main scan image C at operation S20.

At operation S30, it is determined whether the main-scanning operation is performed when the cover 103 is open. Whether the cover is open or closed may be detected by a sensing signal from the sensor. Alternatively, as described before, when a user pushes the "cover-open scan" input key or the "cover-open copy" input key, it may be determined the main-scanning operation is performed when the cover 103 is open.

If it is determined that the main-scanning operation is performed with the cover being open, a document image is extracted from a main scan image acquired by the main-scanning operation on the basis of the environment image (operation S40).

The extracted document image is transmitted to the external apparatus connected to the scanner at operation S60. In this respect, the external apparatus for transmitting the environment image may be different from the external apparatus for storing the extracted document image. For example, the external apparatus for transmitting the environment image may be a management server, and the external apparatus for storing the extracted document image may be a client. Here, the client may include a personal terminal such as a personal computer, PDA, mobile phone, and the like.

If it is determined in operation S30 that the main-scanning operation is performed when the cover is not open, the main scan image is transmitted to the external apparatus (operation S50). That is, if the main-scanning operation is performed when the cover is closed, the main scan image is generated in a general manner and transmitted to the external apparatus. In this respect, the main scan image may be a document image corresponding to an extracted document region. The document region when the cover is closed can be also extracted by a contour extraction algorithm as described above.

Hereinafter, a printing method of an image forming apparatus according to an exemplary embodiment of the present general inventive concept will be described with reference to FIG. 9. The printing method includes the described operations S10 to S60 in the image processing method in the scanner as illustrated in FIG. 8. Further, the printing method of the image forming apparatus may further include printing the main scan image and the extracted document image on a printing medium in operations S50 and S60. The transmission to the external apparatus and the printing of the extracted document image on a printing medium may be performed together, or any one thereof may be performed, in operations S50 and S60.

Figure 8:
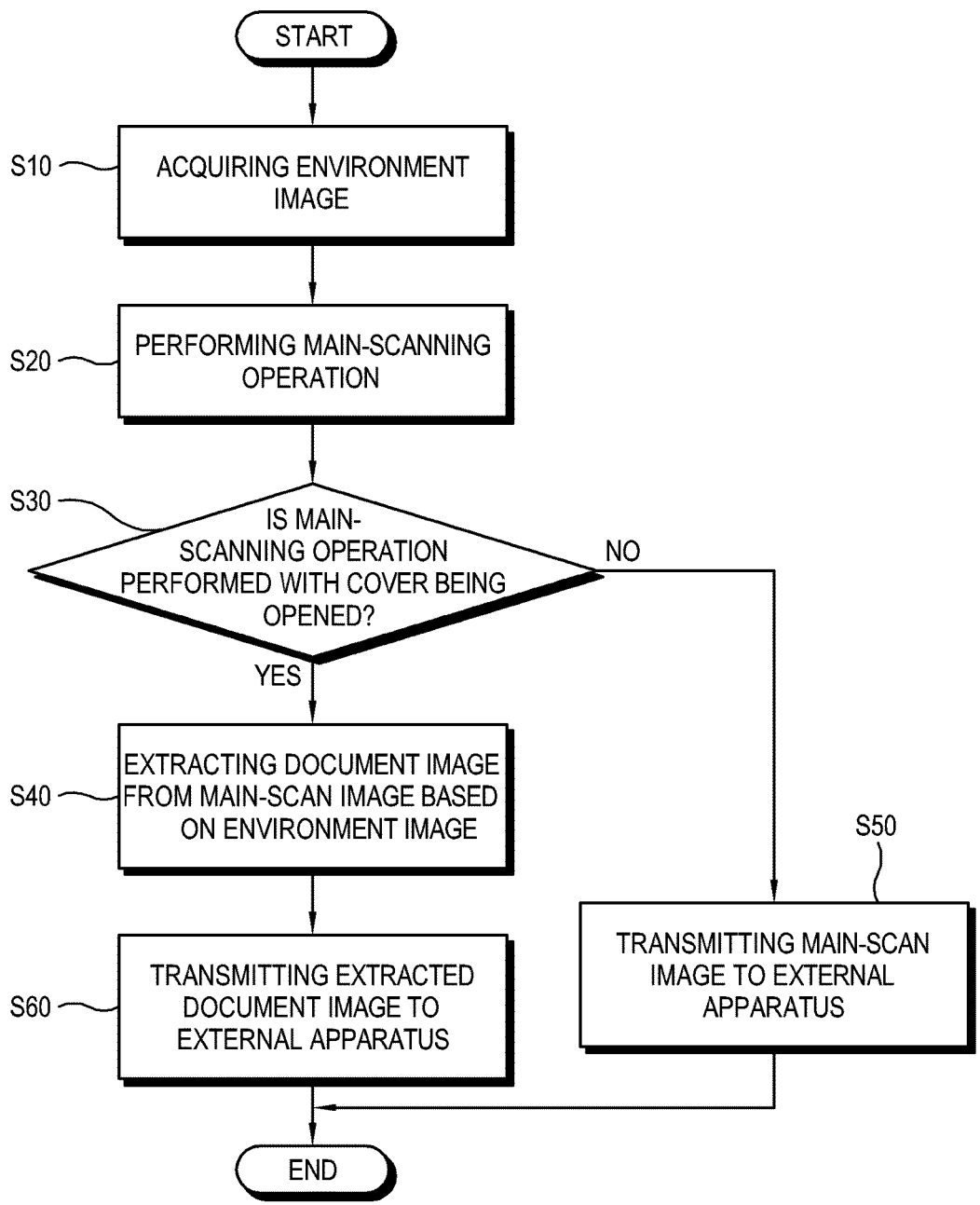
FIG. 8 is a flowchart illustrating an image processing method of a scanner and a printing method of an image forming apparatus, according to an exemplary embodiment of the present general inventive concept.
Figure 9:
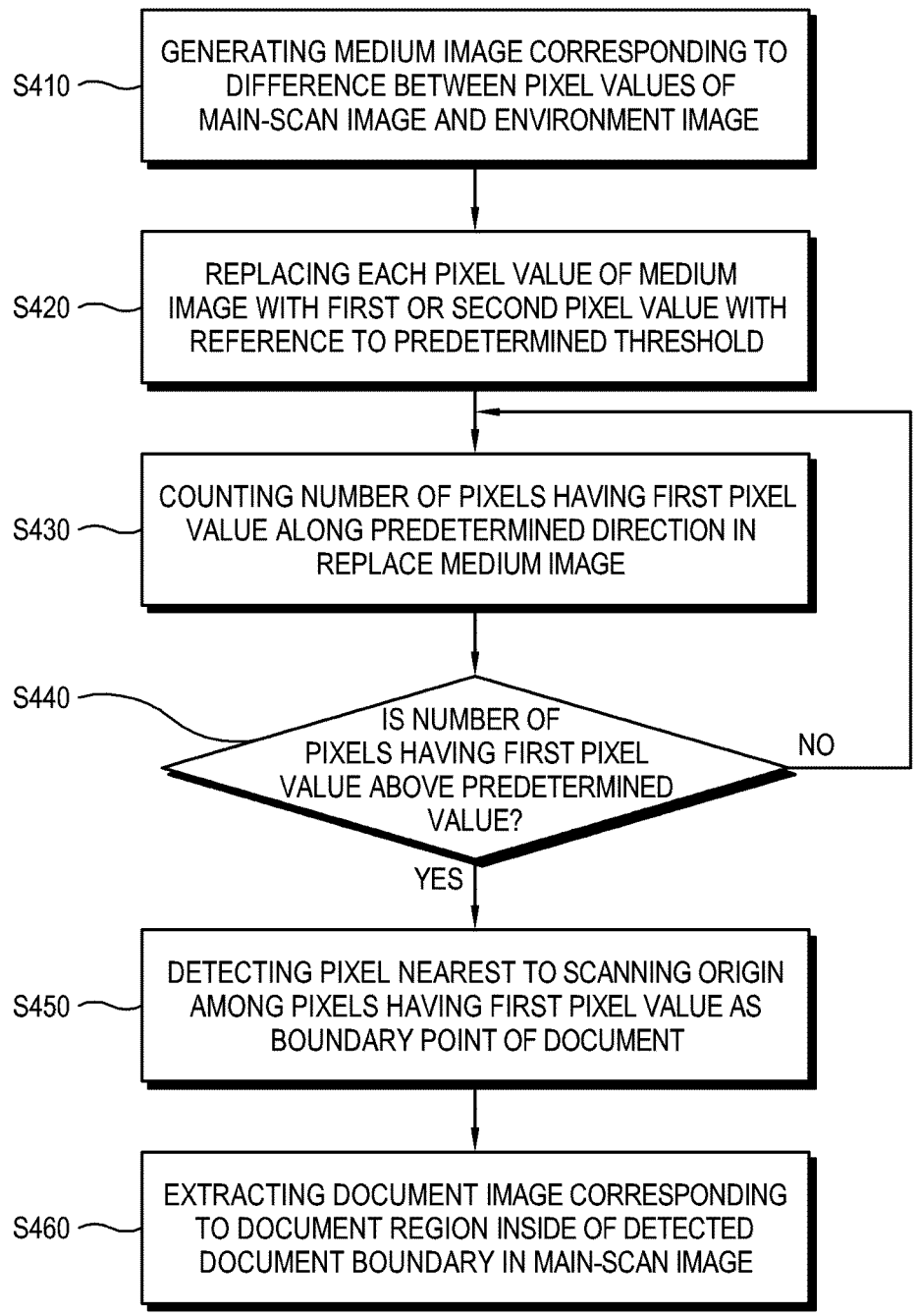
FIG. 9 is a flowchart illustrating a document image extraction process of FIG. 8.

Hereinafter, the acquiring of an environment image in operation S10, as illustrated in FIG. 8, will be further described referring to FIG. 11.

In operation S110, it is determined whether an environment image is stored on the image forming apparatus. If the environment image is not stored on the image forming apparatus, it is determined in operation S120 whether the environment image has been received from an external apparatus. If the environment image has not been received from an external apparatus, a pre-scanning operation is performed to acquire a new environment image (operation S160). After acquiring a new environment image in operation S160, a main-scanning operation is performed in operation S20, as illustrated in FIGS. 8 and 11.

If it is determined either in operation S110 that the environment image is stored on the image forming apparatus or in operation S120 that the environment image has been received from an external apparatus, it is determined in operation S130 whether a predetermined period of time has elapsed since acquiring the environment image. If a predetermined period of time has not elapsed since acquiring the environment image, it is determined in operation S140 whether a request has been received to change the environment image. If a request to change the environment image has not been received, it is determined in operation S150 whether an environment condition has changed. If the environment condition has not changed, a main-scanning operation is performed in operation S20, as illustrated in FIGS. 8 and 11.

If it is determined either in operation S130 that a predetermined period of time has elapsed since acquiring the environment image, in operation S140 that a request has been received to change the environment image, or in operation S150 that the environment condition has changed, a pre-scanning operation is performed to acquire a new environment image (operation S160). After acquiring a new environment image in operation S160, a main-scanning operation is performed in operation S20, as illustrated in FIGS. 8 and 11.

Hereinafter, the document image extraction from the main scan image in operation S40, as illustrated in FIG. 8, will be further described referring to FIG. 9.

A medium image corresponding to a difference between pixel values of the main scan image by the main-scanning operation and the acquired environment image is generated (operation S410). Each pixel value refers to a gray scale of each pixel (i.e., 8 bits, and a value of 0 to 255). The medium image H, as illustrated in FIG. 5, is acquired by subtracting pixel values of the environment image A in FIG. 3 from corresponding pixel values of the main scan image C in FIG. 4.

Each pixel value of the medium image is replaced with at least one of a first pixel value and a second pixel value with reference to a predetermined threshold (operation S420). In this respect, the first pixel value may be "0" (black); and the second pixel value may be "255" (white), and vice versa. Each pixel value of the medium image H in FIG. 5 is replaced with the at least one of the first pixel value (black) and the second pixel value (white), thereby acquiring the replaced medium image K, as illustrated in FIG. 6. Here, the threshold may be suitably selected based on experiments or experiences.

The number of consecutive pixels having the first pixel value in the replaced medium image is counted along a predetermined direction at operation S430. In this respect, the first pixel value may be a pixel value outside of the boundary E of the document region G in the replaced medium image K, as illustrated in FIG. 6. Alternatively, the number of consecutive pixels having the second pixel value instead of the first pixel value may be counted, or the number of consecutive pixels having the first pixel value and the number of consecutive pixels having the second pixel value may be counted together. As illustrated in FIG. 6, the number consecutive of pixels having the first pixel value (black) is counted along the X and Y directions in the replaced medium image K. As described above, along the Y direction from the scanning origin O in the replaced medium image K, the number of consecutive pixels in the first black line L1 may be about 10; the number of consecutive pixels in the second black line L2 may be about 20; and the number of consecutive pixels outside of the boundary E may be more than 100.

At operation S440, it is determined whether the number of consecutive pixels having the first pixel value is above a predetermined value. In this respect, the predetermined value may be set based on experiments or experiences to distinguish between the boundary E in the replaced medium image K and after images such as the black lines L1 and L2 in the document region G in FIG. 6. For example, if the predetermined value is 100, the numbers of pixels in the first and second black lines L1 and L2 are 10 and 20, respectively, that is, less than the predetermined value, and the number of consecutive pixels having the first pixel value (black) outside of the boundary E is above the predetermined value.

If it is determined in operation S440 that the number of consecutive pixels having the first pixel value is above the predetermined value, a pixel nearest to the scanning origin O among the pixels having the first pixel value is determined as a boundary point of the document (operation S450). As described above, the boundary pixel may be any pixel around the nearest pixel. Further, as described before, the number of pixels having the second pixel value (white) in the replaced medium image K may be counted to detect the boundary of the document region. In this case, the total number of the pixels having the second pixel value from a specific pixel in the line M towards the Y direction, as illustrated in FIG. 6, may be counted, and the length corresponding to the total number of the counted pixels may be detected as the boundary E of the document region towards the Y direction. In this respect, if the number of pixels having the first pixel value (black) corresponding to the black lines L1 and L2 is much smaller than the total number of the counted pixels, the black lines L1 and L2 may be ignored. In contrast, if the number of pixels having the first pixel value (black) corresponding to the black lines L1 and L2 is significantly large, this may be included in the total number of the pixels having the second pixel value.

A document image corresponding to the document region inside of the detected boundary is extracted from the main scan image at operation S460. That is, a region outside of the boundary is deleted from the main scan image, thereby extracting the document image. More specifically, the outside region may be cropped from the main scan image, to obtain the final document image. Thus, the final image U as illustrated in FIG. 7 may be extracted from the main scan image C in FIG. 4. The document image may be obtained on the basis of the number of pixels having the first pixel values instead of the number of pixels having the second pixel values. Accordingly, the document image extracting method in FIG. 9 is only exemplary.

Figure 10:
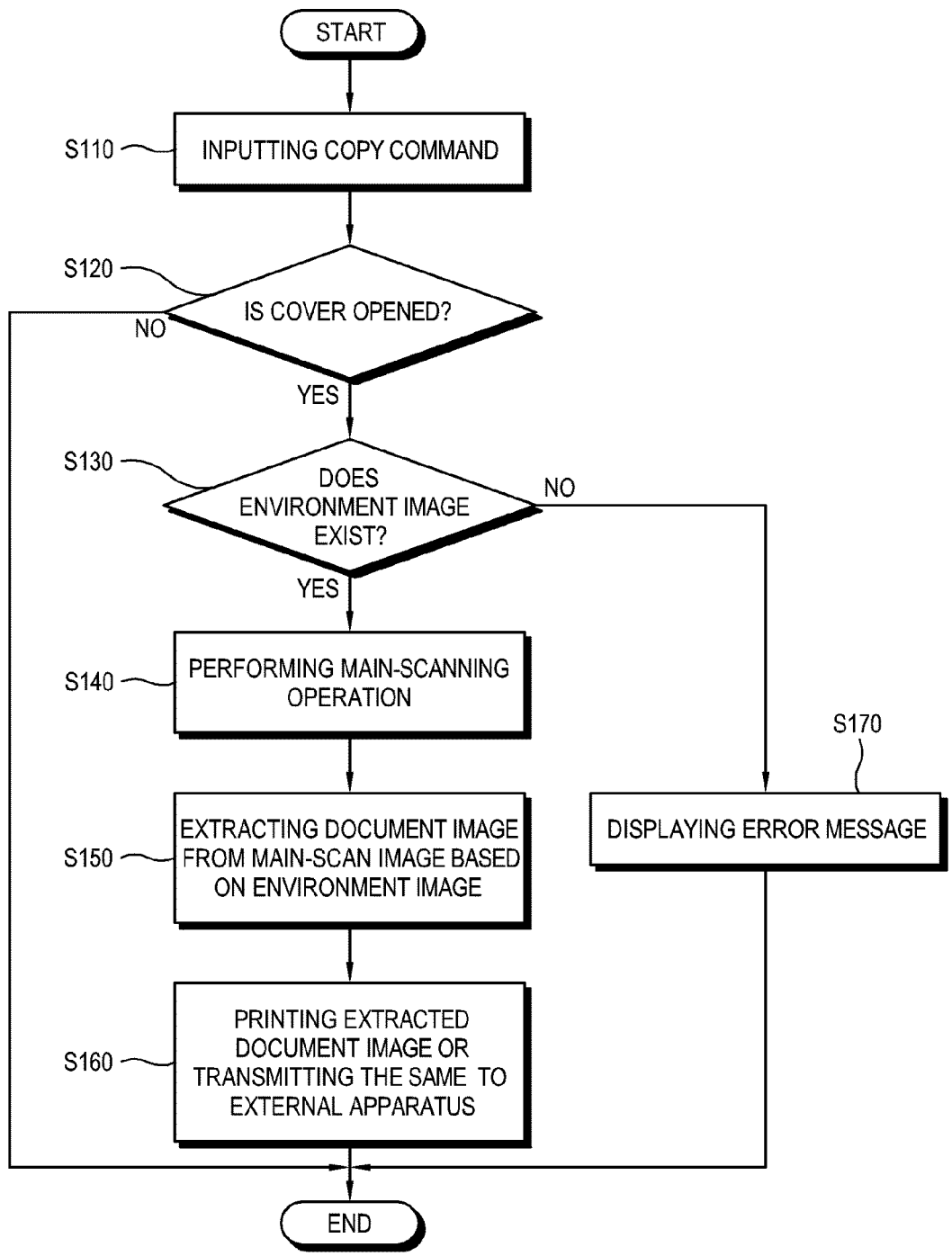
FIG. 10 is a flowchart illustrating a printing method of an image forming apparatus according to another exemplary embodiment of the present general inventive concept.

Hereinafter, a printing method of an image forming apparatus according to another exemplary embodiment of the present general inventive concept will be described referring to FIGS. 2 and 10.

A copy command is inputted by a user at operation S110.

It is determined whether the cover 103 is open at the time of the copy command input at operation S120.

If it is determined that the cover 103 is open, it is determined whether an environment image is stored in the storage part 120 of the image forming apparatus 100 (operation S130).

If it is determined that the environment image is stored in the storage part 120, a main-scanning operation is performed (operation S140), and a document image is extracted from a main scan image acquired by the main-scanning operation on the basis of the environment image at operation S150.

Then, the extracted document image is printed or transmitted to the external apparatus 200 connected to the image forming apparatus 100 at operation S160.

If it is determined in operation S120 that the cover 103 is closed, the process terminates. The document image may be printed in a conventional manner instead of terminating the process.

If it is determined in operation S130 that the environment image is not stored in the storage part 120, an error message is displayed (operation S170). The error message may inform a user that an environment image is required for performing a copy operation when the cover is open, and may include instructions for a user to perform a method for generating an environment image. Further, the error message may be audibly outputted by a speaker, or may be transmitted to an e-mail address of a user.

According to the above-described configuration, the present general inventive concept has the following effects.

Firstly, it is possible acquire a high quality document image with the cover of an image forming apparatus being open. In particular, even in the case that a user opens the cover when performing a scanning or a copying operation by mistake, the user can acquire a document image of a desired quality, thereby enhancing user convenience.

Secondly, unnecessary consumption of a developer can be prevented by printing only a document region.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents

What is claimed is:

1. An image processing method of a scanner including a flatbed for scanning a document and a cover to open and close with respect to the flatbed, the method comprising:
   determining by the scanner whether a document free environment image is stored in the scanner before scanning the document;
   acquiring the document free environment image stored in the scanner when it is determined that the document free environment image is stored in the scanner, and by scanning the flatbed free from a document with the cover in an open position when it is determined that the document free environment image is not stored in the scanner;
   acquiring a main scan image by scanning the document on the flatbed after acquiring the document free environment image; and
   extracting a document image from the main scan image using the acquired environment image when the document is scanned with the cover in an open position, the document free environment image to be replaced with a new document free environment image acquired according to a received request.

2. The method according to claim 1, wherein the acquiring the environment image comprises:
   reading a pre-stored environment image.

3. The method according to claim 1, wherein the acquiring the environment image further comprises:
   acquiring the new document free environment image according to a change in an environment condition.

4. The method according to claim 3, wherein the environment condition comprises:
   at least one of an IP address of the scanner and a power supply status of the scanner.

5. The method according to claim 1, wherein the acquiring the environment image comprises:
   at least one of performing a pre-scanning operation for an external environment of the scanner with the cover in the open position and receiving an environment image from an external apparatus connected to the scanner.

6. The method according to claim 1, wherein the extracting the document image comprises:
   detecting a document region corresponding to the size of the document using a medium image corresponding to a difference between pixel values of the main scan image and the environment image; and
   extracting the document image corresponding to the detected document region from the main scan image.

7. The method according to claim 6, wherein the extracting the document image corresponding to the detected document image comprises:
   cropping the main scan image using the detected document region.

8. The method according to claim 6, wherein the detecting the document region comprises:
   replacing each pixel value of the medium image with one of a first pixel value and a second pixel value with reference to a predetermined threshold; and
   detecting the document region from the replaced medium image on the basis of at least one of the number of pixels having the first pixel value and the number of pixels having the second pixel value.

9. The method according to claim 1, further comprising:
   transmitting the extracted document image to an external apparatus connected to the scanner.

10. The method according to claim 1, the acquiring an environment image further comprising:
    acquiring a new environment image by performing a pre-scanning operation with the cover in an open position if an environment image is not stored on the scanner and an environment image has not been received from an external device.

11. The method according to claim 10, the acquiring an environment image further comprising:
    acquiring a new environment image by performing a pre-scanning operation with the cover in an open position upon the occurrence of any one of a predetermined period of time has elapsed since acquiring an environment image, and an environment condition has changed.

12. The method according to claim 1, the extracting a document image from the main scan image using the environment image comprising:
    generating a medium image corresponding to a difference between pixel values of the main scan image and the acquired environment image; and
    extracting from the main scan image the document image corresponding to a document region inside of a detected boundary of the document region.

13. The method according to claim 12, the extracting a document image from the main scan image using the environment image further comprising:
    counting the number of pixels having a first pixel value in the medium image along a predetermined direction;
    determining whether the number of pixels having the first pixel value is above a predetermined value; and
    detecting a pixel nearest to a scanning origin among the pixels having the first pixel value to determine a boundary point of a document image.

14. The method according to claim 12, the extracting a document image from the main scan image using the environment image further comprising:
    replacing each pixel value of the medium image with at least one of a first pixel value or a second pixel value; and
    counting the number of pixels having a second pixel value in the medium image to detect the boundary of the document region.

15. A printing method of an image forming apparatus including a scanning part which scans a document on a flatbed and a cover to open and close with respect to the flatbed, the method comprising:
    determining by the image forming apparatus whether a document free environment image is stored in the image forming apparatus before scanning the document;
    acquiring the document free environment image stored in the scanning part when it is determined that the document free environment image is stored in the scanning part, and by scanning the flatbed free from a document with the cover in an open position when it is determined that the document free environment image is not stored in the scanner;

scanning the document on the flatbed and forming a main scan image after acquiring the document free environment image;

extracting a document image from the main scan image using the acquired environment image when the scanning of the document is performed with the cover in an open position; and printing the extracted document image, the document free environment image to be replaced with a new document free environment image acquired according to a received request.

16. A printing method of an image forming apparatus including a scanning part which scans a document on a flatbed and a cover to open and close with respect to the flatbed, the method comprising:

determining by the image forming apparatus whether a document free environment image is stored before scanning the document when a copy command is input when the cover is in an open position;

acquiring the document free environment image stored in the scanning part when it is determined that the document free environment image is stored in the scanning part, and by scanning the flatbed free from a document with the cover in an open position when it is determined that the document free environment image is not stored in the scanner;

acquiring a main scan image by scanning a document on the flatbed when it is determined that the document free environment image is stored and extracting a document image from the main scan image using the acquired document free environment image; and outputting an error message when it is determined that the environment image is not stored, the stored document free environment image to be replaced with a new document free environment image acquired according to a received request.

17. A scanner, comprising:
a flatbed;
a cover to open and close with respect to the flatbed;
a scanning part to obtain a main scan image by scanning a document on the flatbed;
a storage part to store a document free environment image obtained by scanning the flatbed free from a document with the cover in an open position; and
a controller to determine whether the document free environment image is stored in the storage part before the document is scanned, to prompt a user to acquire the document free environment image stored in the storage part when it is determined that the document free environment image is stored in the storage part and by scanning the flatbed free from a document with the cover in an open position when it is determined that the document free environment image is not stored in the storage part, and to extract a document image from the main scan image using the acquired document free environment image when the document is scanned with the cover in an open position, the stored document free environment image to be replaced with a new document free environment image acquired according to a received request.

18. The scanner according to claim 17, wherein the controller further controls the scanning part to perform a pre-scanning operation for an external environment of the scanner according to a change in an environment condition, and stores a pre-scan image acquired by the pre-scanning operation as the environment image in the storage part.

19. The scanner according to claim 18, wherein the environment condition comprises at least one of an IP address of the scanner and a power supply status of the scanner.

20. The scanner according to claim 17, further comprising:
a communication part to communicate with an external apparatus, wherein the controller receives an environment image from the external apparatus through the communication part according to at least one of a received request and a change in an environment condition to update the environment image.

21. The scanner according to claim 17, wherein the controller detects a document region corresponding to the size of the document using a medium image corresponding to a difference between pixel values of the main scan image and the environment image.

22. The scanner according to claim 21, wherein the controller replaces each pixel value of the medium image with a first pixel value or a second pixel value with reference to a predetermined threshold, and detects the document region in the replaced medium image on the basis of at least one of the number of pixels having the first pixel value and the number of pixels having the second pixel value.

23. The scanner according to claim 17, further comprising:
a communication part to communicate with an external apparatus, wherein the controller transmits the extracted document image to the external apparatus through the communication part.

24. An image forming apparatus, comprising:
a flatbed;
a cover to open and close with respect to the flatbed;
a scanning part to acquire a main scan image by scanning a document on the flatbed;
a storage part to store a document free environment image obtained by scanning the flatbed free from a document with the cover in an open position;
a controller to prompt a user to acquire the document free environment image stored in the storage part when it is determined that the document free environment image is stored in the storage part and by scanning the flatbed free from a document with the cover in an open position when it is determined that the document free environment image is not stored in the storage part, and to extract a document image from the main scan image using the acquired document free environment image when the document is scanned with the cover in an open position; and
a printing part which prints the document image extracted by the scanner on a printing medium, the stored document free environment image to be replaced with a new document free environment image acquired according to a received request by scanning the flatbed free from the document with the cover in the open position.

* * * * *